(12) United States Patent
Disbo

(10) Patent No.: US 6,262,499 B1
(45) Date of Patent: Jul. 17, 2001

(54) DEVICE FOR PROVIDING A LINEAR MOVEMENT

(75) Inventor: Bo-G. Disbo, Skärholmen (SE)

(73) Assignee: AB Rexroth Mecman, Stockholm (SE)

( * ) Notice: Subject to any disclaimer, the term of this patent is extended or adjusted under 35 U.S.C. 154(b) by 0 days.

(21) Appl. No.: 09/516,389

(22) Filed: Mar. 1, 2000

(30) Foreign Application Priority Data

Mar. 24, 1999 (SE) .................................................. 9901084

(51) Int. Cl.⁷ .................................................. H02K 41/00
(52) U.S. Cl. .................................................. 310/12
(58) Field of Search .................................. 310/12, 13, 14, 310/71

(56) References Cited

U.S. PATENT DOCUMENTS

| | | | |
|---|---|---|---|
| 4,394,593 | * 7/1983 | Gocho | ..................................... 310/54 |
| 5,175,456 | * 12/1992 | Neff et al. | ................................ 310/13 |
| 6,057,616 | * 5/2000 | Pelstring | .................................. 310/71 |
| 6,075,297 | * 6/2000 | Izawa et al. | ............................. 310/12 |

* cited by examiner

*Primary Examiner*—Nestor Ramirez
*Assistant Examiner*—Judson H. Jones
(74) *Attorney, Agent, or Firm*—Townsend and Townsend and Crew LLP

(57) ABSTRACT

A device (1) for providing a working means (2) with a linear movement during simultaneous energy and/or signal supply over a supply conduit or conduit(s) (10,18), includes a linear motor (3,4), an elongated rod means (16) onto which the working means (2) is arranged. The invention is distinguished by the linear motor being of a kind including a movement transferring means extending radially sideways from the motor, and being connected to the rod means, that the rod means (16) comprises a longitudinal channel for the reception of said supply conduit, and that a linear guide (8) for the rod means (16) is fixedly attached to the linear motor.

8 Claims, 1 Drawing Sheet

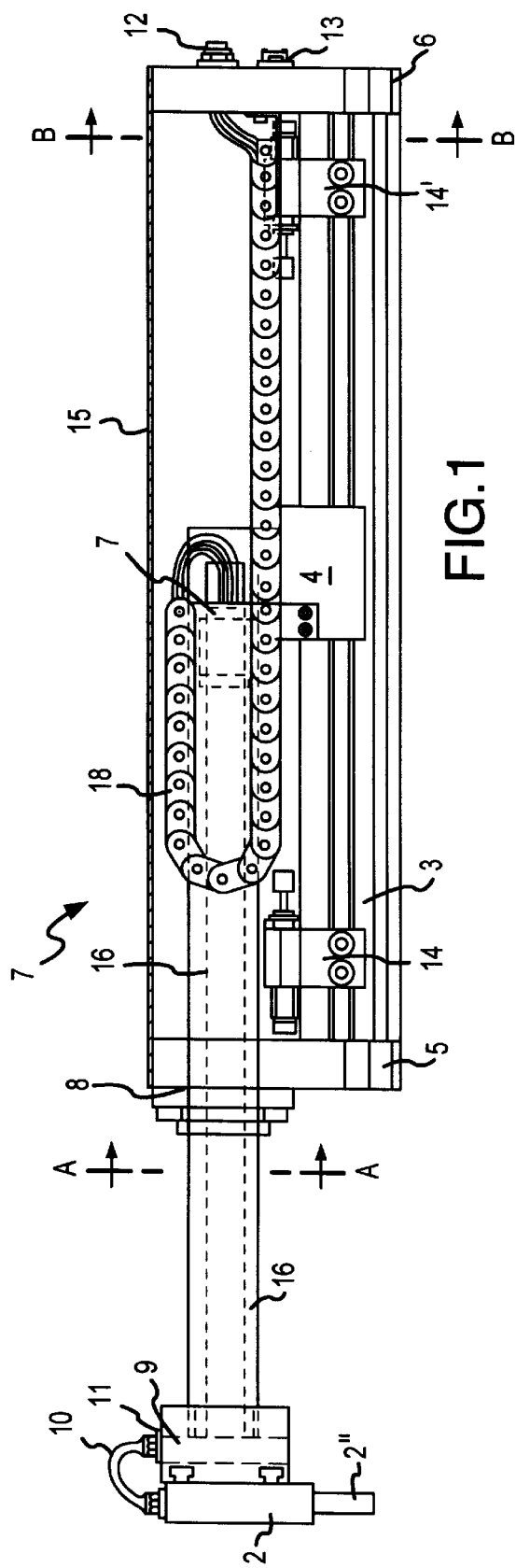
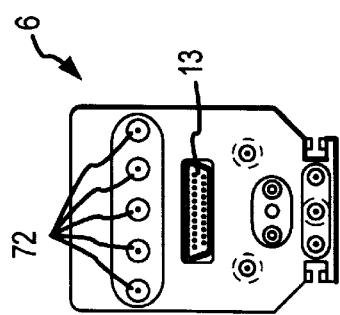
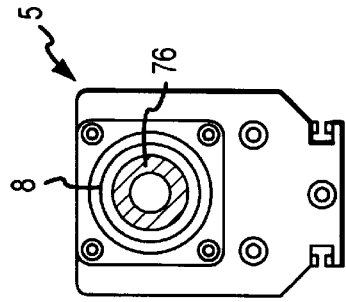
FIG.1
FIG.3
FIG.2

DEVICE FOR PROVIDING A LINEAR MOVEMENT

This invention concerns a device for providing a linear movement according to the preamble of claim 1.

Among such devices are previously known piston rod cylinders, which most outwardly on the piston rod comprises means for co-operation with a mechanical gripper, a suction gripper and the like. The prior art devices, however, suffer from a number of drawbacks, on the one hand based on the fact that conduits for leading signals and/or energy to the working tool typically hang loosely and are more or less freely moveable during the working stroke of the piston. These loose conduits are obvious sources of problems with the operation, since the conduits are easily hooked into or damaged by items in proximity to the equipment. Also acceleration forces from moving equipment may bring about damages to the loose conduits. Further, the known device needs a separate rotational guide in order to ensure that the piston, together with the associated working tool, does not rotate in operation, which results in a more complex and expensive device.

It is an aim of the invention to provide a device according to the above, wherein the drawbacks of the prior art are avoided.

This is achieved in such a device through the features of the characterising portion of claim 1.

By the linear motor being of a kind including an axially moveable movement transferring means which extends radially from the motor and is connected to the rod means, it is achieved that the conduits for e.g. fluid, electricity and/or signal supply may be easily placed inside the channel of the rod means. The conduits may then be located entirely outside the linear motor itself. This results in simple placement of conduits as well as ensured safety against external damages on the conduits, whereby the reliability of the equipment to withstand running problems is increased. Further, guidance preventing rotation is easily obtained automatically by the movement transfer means, which is rotationally rigidly connected to the rod means, and which is guided so as to prevent rotation.

It is preferred that the linear motor is a rodless so called slot cylinder, since this in the simplest way ensures non-rotational effect by the construction of the slot cylinder. The motor also becomes compact and without any need of e.g. a rotational motor in case a screw/nut mechanism is used.

In order to ensure proper guidance of the rod means during its axial movement, a linear guide for guiding the rod means is provided, which supports the rod means between its ends and which is attached to the linear motor.

The invention enables a clean and logical assembly, since the supply conduits, for example air tubes and electrical sensor cables, are placed inside the rod means. In this way it is easy to arrange interfaces, on the one hand against a working tool and on the other hand against a possible control unit and power source.

By arranging the linear guide integral with one of the end walls of the inner motor, simplified manufacture and assembly of the device is achieved. In case of a slot cylinder, a cylinder end wall is hereby extending radially so as to include a bearing for passage of the rod means besides the conventional arrangement in a cylinder end wall, such as fluid channels, sealing seats, screw holes etc. The corresponding goes in case any another kind of a linear motor is used. This way a unit is provided, which is rational to manufacture, and where separate guiding arrangements may be avoided. This advantage is accentuated if the device according to the invention also includes a second end wall, which in a corresponding way is constructed to include seats for coupling means to signal and fluid connections. In that case this second end wall comprises said interface against a possible control unit and power source.

Further advantages with different aspects of the invention are evident from the following detailed description of an embodiment, which is described with reference to the annexed drawing, wherein:

FIG. 1 shows a device according to the invention for providing a linear movement in a side view, and FIG. 2 and FIG. 3 show in details in views in the directions A—A and B—B respectively in FIG. 1, the respective end walls of the device in FIG. 1.

In FIG. 1, reference 1 indicates a device for bringing a linear movement to a working means 2, which in this case is a gripper with gripper jaws, indicated with 2'. The device 1 includes a linear motor, which in this preferred case is a slot cylinder or a rodless cylinder, wherein a movement transferring element transmits an axial movement sideways from a piston (not shown), which is moveable inside a cylinder tube 3, to a so called carriage 4, which as usual is guided in its movement along the length of the cylinder 3. The cylinder includes a front end wall 3 and a rear end wall 6. Onto the shuttle there is attached a fastening means 7, for fastening a rod means 16, onto the carriage 4. The rod means 16 is thus fixedly coupled to the carriage for axial movement in the length direction of the cylinder.

Besides the usual recesses for sealing against the tube 3 and fluid channels etc., the front end wall 5 comprises a linear guide 8 for the rod means 16, which guide 8 as an example may include a bushing which is pressed into the front end wall 5. In this embodiment the rod means 16 is shaped as a circular cylindrical tube with its inside channel accessible through an (not shown) aperture in the fastening means 7 for bringing conduits into the channel. At the free end of the rod means 16 an adapter 9 is provided, which on the one hand includes means for receiving working tools of different kinds, on the other hand apertures for conduits and cables which are intended to be connected to the working tool, or to possible seats for coupling means 11 for such conduits 10. The adapter and the working tool may possibly have a quick connection for simultaneous fastening and connection of fluid channels and signal cables.

On the rear end wall 6 there are arranged terminals 12 and 13 for fluid and signal supply for connecting the device to a control unit and/or a fluid source or the like. The connections may be per se known quick connection means.

14 and 14' indicate end position stoppers with dampers being adjustable in the length direction of the cylinder and ensuring accurate positioning of the working means 2 in the length direction.

A cable loop in the form of a cable chain 18 allows the axial movement of the carriage 4 with an accurate reception of the slack in the cabling created by the movement.

The device is covered by a hood 15, which preferably adjoins to the extended end walls 5 and 6, whereby preferably the hood 15 is comprised of a plate which is curved in a single direction.

FIG. 2 shows in greater detail the front end wall 5 with inserted bushing, at 8, for the rod means in FIG. 1. The end wall also includes a seat for a cylinder seal (not shown). The end wall is mounted onto the cylinder tube in a conventional way, for example by spanning rods which are inserted in through-holes in the cylinder tube.

In FIG. 3, a corresponding view of the rear end wall 6 is shown with fluid and signal conduit contacts 12 and 13. Also this end wall includes a sealing seat which is not shown here.

The invention may be modified within the scope of the claims, and, for an example, the rod means may be shaped otherwise, for example with an open cross section, and instead with a space such as an open groove for reception of cables and conduits. The fastening of the working means onto the rod means may be arranged otherwise, for example without the intermediate of a special adapter, but instead through a simple screw thread or the like between the rod means and the working means.

The linear guide for the rod means, corresponding to 8 in the described embodiment, may be arranged otherwise, for example with a separate bearing, which is fastened to the slot cylinder the area of one of its end walls.

Also the arrangement with the placing of the conduits at the rear part of the slot cylinder may be arranged otherwise. The connections may for example be provided at the end of conduits of a certain length extending from the device.

The device according to the invention is useful in applications were accurate positioning is demanded. It may easily be attached to a rotational table or the like for achieving movements in further dimensions.

As indicated, different kinds of linear motors may be utilised provided they are of a kind including a movement transmitter extending radially from the motor. As examples may be mentioned a mechanism having a stationary but rotationally driven screw, which in turn drives a rotationally locked but axially moveable nut which is connected to the movement transmitter.

What is claimed is:

1. Device (1) for providing a working means (2) with a linear movement during simultaneous energy and/or signal supply over a supply conduit or conduit(s) (10,18), including a linear motor (3,4), an elongated rod means (16), which is operationally connected (7) to the linear motor for axial displacement, and onto which the working means (2) is arranged at distance from the linear motor, characterized in that the linear motor is of kind including an axially moveable movement transferring means extending radially sideways from the motor, and being connected to the rod means, that the rod means (16) comprises a longitudinal channel for the reception of said supply conduit, and that a linear guide (8) for the rod means (16) is fixedly attached to the linear motor.

2. Device according to claim 1, characterized in that the linear motor is a slot cylinder (3,4) with an axially moveable movement transferring means extending from the cylinder slot, and being connected to the rod means.

3. Device according to claim 1, characterized in that the linear guide (8) is integral with one of the end walls (5) of the linear motor.

4. Device according to claim 1, characterized in that the end wall (6) of the linear motor at the side opposite to the linear guide (8) includes seats for coupling means (12,13) to said supply conduit or conduit(s).

5. Device according to claim 1, characterized in that the rod means (16) is a tube having circular cross section.

6. Device according to claim 1, characterized in that the linear motor comprises at least one movable end position stopper (14,14').

7. Device according to claim 1, characterized in that the rod means (16) at its free end comprises an adapter (9) for connection of a working means (2).

8. Device according to claim 1, characterized in that a hood (5) is provided, which adjoins to the end walls (5,6).

* * * * *